United States Patent [19]

Veronesi et al.

[11] Patent Number: 4,913,563
[45] Date of Patent: Apr. 3, 1990

[54] HYDRODYNAMIC PIVOTED PAD BEARING ASSEMBLY FOR A REACTOR COOLANT PUMP

[75] Inventors: Luciano Veronesi, O'Hara Township, Allegheny County; Leonard S. Jenkins, Plum Borough, both of Pa.

[73] Assignee: Westinghouse Electric Corp., Pittsburgh, Pa.

[21] Appl. No.: 268,141

[22] Filed: Nov. 7, 1988

[51] Int. Cl.$^4$ ............................................. F16C 17/03
[52] U.S. Cl. ..................................................... 384/312
[58] Field of Search ............... 384/312, 117, 263, 261, 384/252, 309, 311

[56] References Cited

U.S. PATENT DOCUMENTS

| | | |
|---|---|---|
| 2,898,164 | 8/1959 | Patton . |
| 3,337,276 | 8/1967 | Cherubim ........................ 384/312 |
| 3,427,082 | 2/1969 | Hagen . |
| 3,476,447 | 11/1969 | Boyd . |
| 3,497,276 | 2/1970 | McGrew et al. .................. 384/312 |
| 3,542,441 | 11/1970 | Nixon . |
| 3,604,767 | 9/1971 | Decker ............................. 384/312 |
| 3,675,977 | 7/1972 | Arsenius et al. ................. 384/117 |
| 3,918,272 | 11/1975 | Honold et al. .................... 64/23 |
| 3,972,572 | 8/1976 | Hohn . |
| 4,036,561 | 7/1977 | Harand et al. .................... 415/18 |
| 4,369,925 | 1/1983 | Morishita et al. ................ 384/117 |
| 4,568,204 | 2/1986 | Chambers ......................... 384/152 |
| 4,596,471 | 6/1986 | Krammer ........................... 384/98 |

FOREIGN PATENT DOCUMENTS

| | | |
|---|---|---|
| 0074127 | 3/1983 | European Pat. Off. . |
| 0074888 | 3/1983 | European Pat. Off. . |
| 57-29811 | 2/1982 | Japan . |
| 59-194123 | 2/1984 | Japan . |

Primary Examiner—Lenard A. Footland

[57] ABSTRACT

A nuclear reactor coolant pump utilizes a pivoted pad bearing assembly to rotatably mount its shaft through the pump housing. The bearing assembly includes a plurality of arcuate bearing segments disposed end-to-end in circumferentially spaced relation for encompassing the shaft and providing bearing contact therewith, and a plurality of pivot pins each extending radially between an outer annular split ring attached to the pump housing and one of bearing segments. The pivot pins are mounted for universal pivotal movement at their inner ends with the respective bearing segments. The pivot pins at their outer ends are mounted to the annular ring for adjustable radial movement for changing the radial position of the pivot pins relative to annular ring and thereby of the bearing segments relative to the shaft. A plurality of locking cups are provided for coupling the pivot pins in locked relation the annular ring to fix the pivot pins in desired adjusted positions relative thereto.

22 Claims, 6 Drawing Sheets

HYDRODYNAMIC PIVOTED PAD BEARING ASSEMBLY FOR A REACTOR COOLANT PUMP

BACKGROUND OF THE INVENTION

1. Field of the Invention

The present invention relates generally to bearings and, more particularly, is concerned with a hydrodynamic pivoted pad bearing assembly for a reactor coolant pump.

2. Description of the Prior Art

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example 550 degrees F. and 2250 psi. The pump basically includes three general sections from top to bottom—motor, shaft seal and hydraulic sections. The upper motor section includes a motor which is coupled to drive a vertical pump shaft. The middle shaft seal section includes three tandem sealing assemblies located concentric to, and near the top end of, the pump shaft. Their combined purpose is to mechanically contain the high positive pressure coolant of the reactor coolant system from leakage along the pump shaft to the containment atmosphere during normal operating condition.

The lower hydraulic section includes an impeller mounted on the lower end of a pump shaft which is operable within-the pump casing to pump reactor coolant about the respective loop. The hydraulic section also includes a heat exchanger and a lower radial journal bearing assembly disposed in tandem relationship about the pump shaft above the impeller. The heat exchanger functions to reduce the rate of heat flow from the reactor coolant into the pump bearing and seal areas. The journal bearing assembly includes a two-piece horizontally split housing, a bearing cartridge, and a journal. The inside diameter of the housing is machined to a spherical shape which mates with a spherical surface on the outside diameter of the bearing cartridge to allow the bearing assembly to self-align. The bearing cartridge operates against the journal which is shrunk fit on the pump shaft. This bearing assembly is lubricated and cooled by seal injection water flow downward from the seal section to the thermal barrier area of the heat exchanger.

The lower radial bearing assembly of the abovedescribed construction has undergone many hours of operation and overall has performed satisfactorily. However, one significant drawback of the radial bearing assembly is that it tends to whirl and generate undesirable vibration due to such whirl. This is particularly evident in some pump designs as bearing radial load decreases (as the loop temperature increases). Also, over zealous pump balancing which removes all or most of the running speed component of vibration can result in a non-linearly related increase in vibration at bearing whirl frequency. Consequently, a need exist for an alternative approach to bearing design with the objective of overcoming the above-cited drawback without introducing a set of new ones.

SUMMARY OF THE INVENTION

The present invention provides a hydrodynamic pivoted pad bearing assembly designed to satisfy the aforementioned need. The bearing assembly of the present invention employs a plurality of pivoted arcuate bearing segments which are radially adjustable and universally pivoted allowing the segments to be offset from their machining center to provide for preloading of the pump shaft. Such preloading will increase the bearing radial stiffness to restrain shaft orbiting when low load exists and will also prevent pad flutter. The pivoted segments have the ability to accommodate shaft deflection or misalignment and can, therefore, carry relatively higher loads than journal bearings. Another advantage their freedom from lubricant whirl/whip instability. This makes them suitable for such applications as vertical guide bearings or lightly loaded bearings as in the case of the reactor coolant pump. A further advantage is that the pivoted pad bearing assembly of the present invention can be employed in place of the journal bearing assembly without modification to the reactor coolant pump.

Accordingly, the present invention is directed to a pivoted pad bearing assembly for rotatably supporting a shaft extending through a housing. The pivoted pad bearing assembly comprises: (a) an annular member fixedly attachable to the housing; (b) a plurality of arcuate bearing segments disposable end-to-end in circumferentially spaced relation for encompassing the shaft and providing bearing contact therewith; (c) a plurality of pivot pins each extending radially between the annular member and one of the bearing segments; (d) means for universally pivotally mounting each of the pivot pins at an inner end thereof to one of the bearing segments; and (e) means for mounting each of the pivot pins at an outer end thereof to the annular member and being adjustable for charging the radial position of the pivot pin relative to the annular member and thereby of the arcuate bearing segment relative to the shaft.

More particularly, the pivot pin inner mounting means includes a cup element having an internal bore surface and being mounted in a recess formed at an exterior surface of each of the bearing segments. The mounting means also includes an external contact surface on the inner end of each of the pivot pins. One of the cup element internal bore surface or the pivot pin inner end contact surface has an annular cylindrical contour, whereas the other has an annular spherical contour allowing universal pivoting therebetween.

Further, the pivot pin outer end mounting means includes means for defining a plurality of circumferentially spaced and radially extending openings through the annular member for receiving the respective pivot pins, a set of external threads formed on the outer end of each of the pivot pins, and a plurality of adjustment elements each having a set of internal threads formed thereon for threadably mating with the set of external threads on one of the pivot pin outer ends such that relative rotation between each pivot pin and its respective adjustment element; causes a change of the radial position of the pivot pin relative to the annular member.

Also, the bearing assembly includes means for lockably coupling each pivot pin to the annular member to fix the pivot pin in a desired adjusted position relative to the annular member. In particular, the lockable coupling means includes means defining at least one recess in the annular member at the periphery of each of the openings therethrough which extends radially from the opening, means defining at least one notch in a peripheral edge of each of the adjustment elements which extends radially to one of the openings, means defining at least one longitudinally extending slot in the outer end of each of the pivot pins which also extends radially to one of the openings, and a plurality of locking cups each being disposable, in one of the openings. Each of the cups has at least one projection capable of extending into the slot for maintaining the cup in non-rotatable relation to one of the pivot pins. Also, each of the cups has a cylindrical wall with portions deformable into one of the recesses of the annular member and one of the notches of the adjustment element for maintaining the cup in non-rotatable relation thereto.

The means for universal pivotally mounting each pivot pin inner end to one of the arcuate bearing segments releasably mounts the pivot pin at its inner end. The bearing assembly also includes means for retaining the pivoted bearing segments on the annular member to preclude inadvertent release of the pivot pins at their inner ends from the arcuate bearing segments before the bearing assembly is mounted about the shaft.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
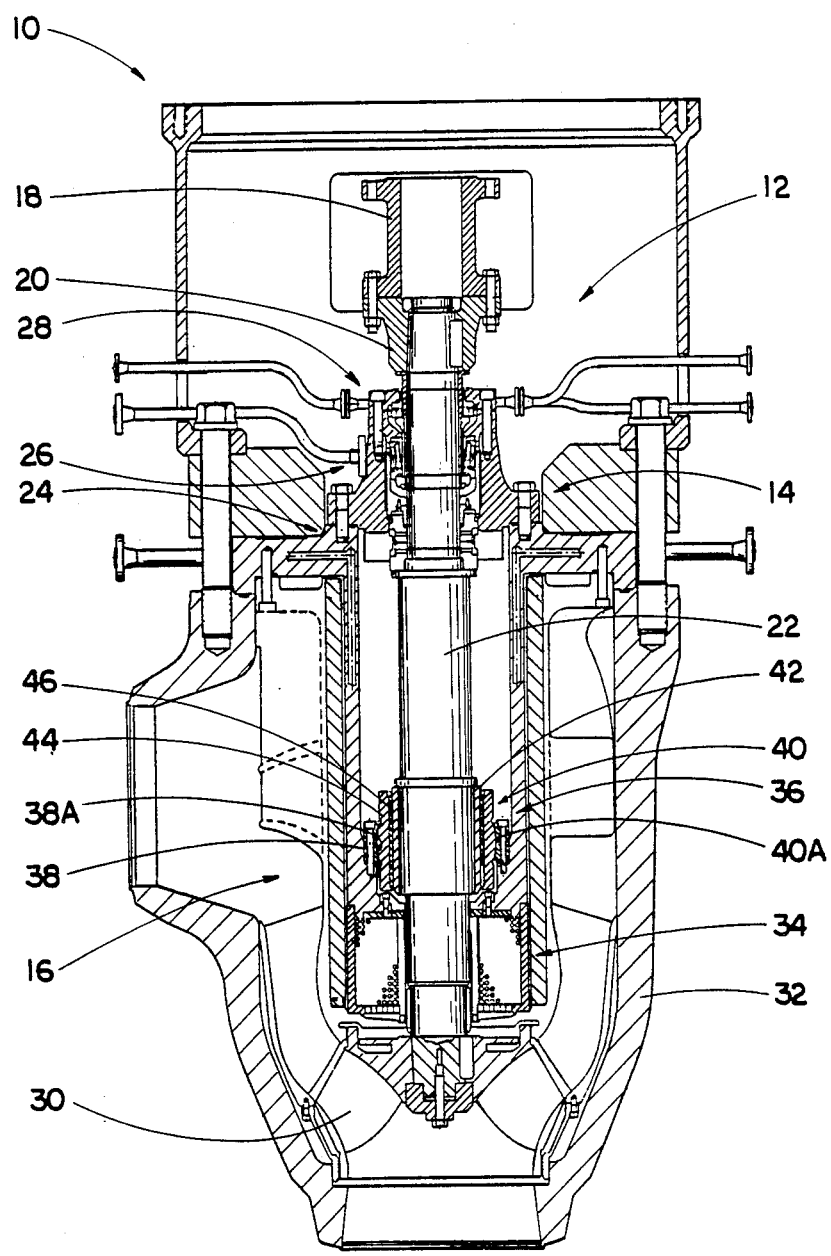
FIG. 1 is an axial sectional view, partly in elevation, of a prior art nuclear reactor coolant pump.
Figure 2:
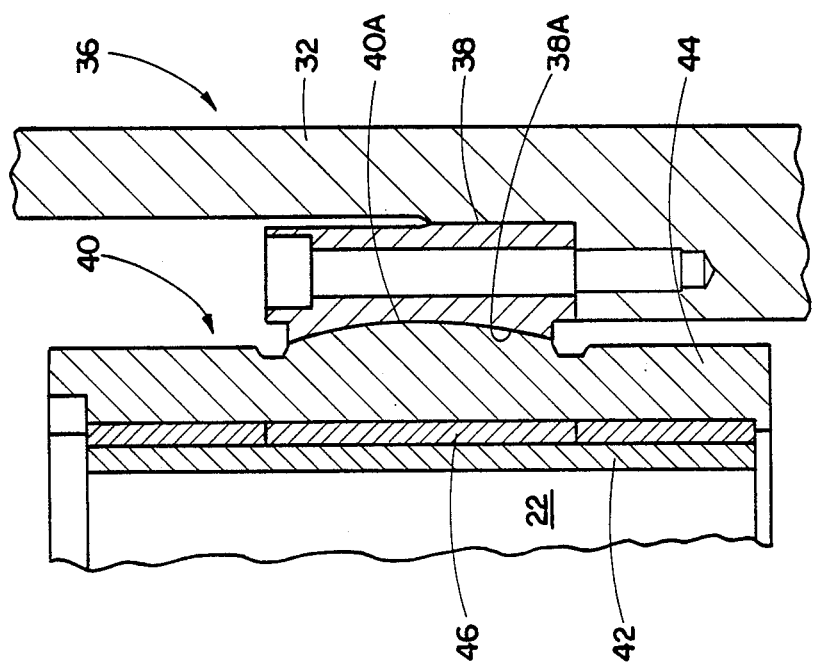
FIG. 2 is an enlarged fragmentary axial sectional view of a prior art radial bearing assembly employed in the reactor coolant pump of FIG. 1.

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms. Prior Art Reactor Coolant Pump Referring now to the drawings, and particularly to FIGS. 1 and 2, there is illustrated a reactor coolant pump, generally designated 10, employed in a reactor coolant system of a pressurized water nuclear power plant. The reactor coolant pump 10 is a vertical, single stage, centrifugal pump designed to move large volumes of reactor coolant at high temperatures and pressures, for example 550 degrees F. and 2250 psi. The pump 10 basically includes three general sections from top to bottom—motor, shaft seal and hydraulic sections 12-16. The upper motor section 12 includes a motor (not shown) which is supported by a motor support stand 18 and coupled by spool 20 to drive a vertical pump shaft 22. The middle shaft seal section 14 includes three axially-spaced tandemly-arranged primary, secondary and tertiary sealing assemblies 24-28 located concentric to, and near the top end of, the pump shaft 22. Their combined purpose is to mechanically contain the high positive pressure coolant of the reactor coolant system from leakage along the pump shaft 22 to the containment atmosphere during normal operating condition.

The lower hydraulic section 16 includes an impeller 30 mounted on the lower end of the pump shaft 22 which is operable within the pump casing 32 to pump reactor coolant about the respective loop. The hydraulic section 16 also includes a heat exchanger 34 and a lower radial journal bearing assembly 36 disposed in tandem relationship about the pump shaft 22 above the impeller 30. The heat exchanger 34 functions to reduce the rate of heat flow from the reactor coolant into the pump bearing and seal areas.

The journal bearing assembly 36 (best seen in FIG. 2) of the hydraulic section 16 includes a two-piece annular horizontally split housing 38, an annular bearing cartridge 40, and an annular journal 42. The inside diameter surface 38A of the housing 38 is machined to a spherical shape which mates with a spherical surface 40A on the outside diameter of the bearing cartridge 40 to allow the bearing assembly 36 to self-align. The bearing cartridge 40 includes an outer stainless steel sleeve 44 and an inner graphite bushing 46 which operates against the journal 42 in the form of a stellite bushing shrunk fit on the pump shaft 22. The prior art journal bearing assembly 36 is lubricated and cooled by seal injection water flow downward from the shaft seal section 14 to the thermal barrier area of the heat exchanger 34 of the hydraulic section 16.

Hydrodynamic Pivoted Pad Bearing Assembly

Turning now to FIGS. 3-10, there is illustrated a hydrodynamic pivoted pad bearing assembly of the present invention, generally designated 48, which, as an improvement over the prior art journal bearing assembly 36, has the capability of accommodating pump shaft deflection or misalignment and of counteracting shaft orbiting or wobble, particularly bearing "water whirl". In its basic components, the pivoted pad bearing assembly 48 includes an annular member 50, a plurality of arcuate bearing segments 52, and a plurality of pivot pins 54 each extending radially between the annular member 50 and one of the bearing segments 52. In the exemplary embodiment, the respective pluralities of bearing segments 52 and pivot pins 54 are each four in number, although some other number could be utilized.

Figure 4:
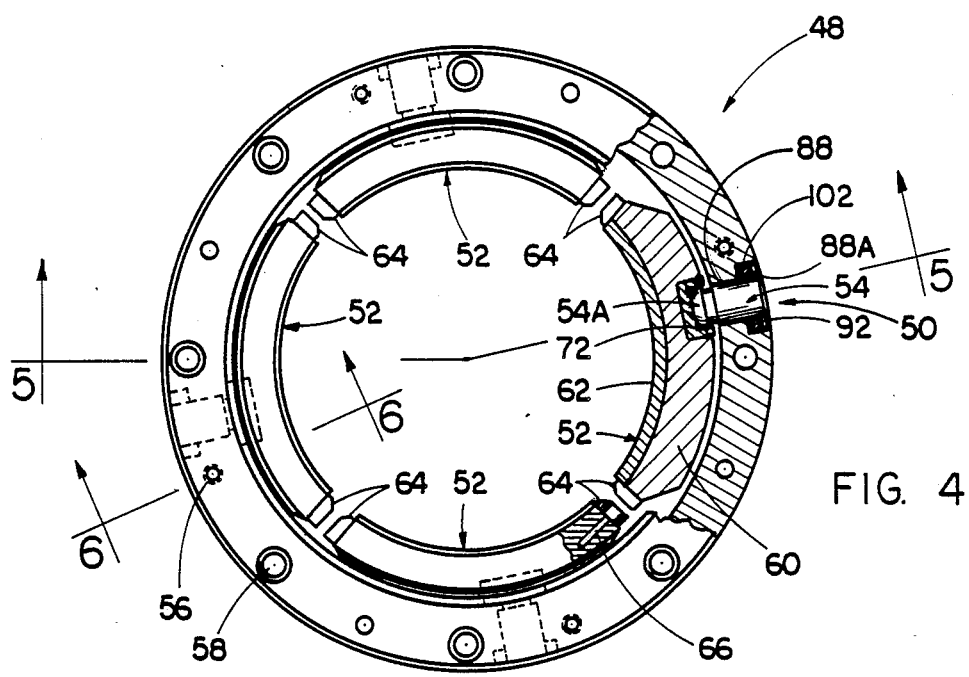
FIG. 4 is a top plan view, partly broken away and sectioned, of the pivoted pad bearing assembly.
Figure 5:
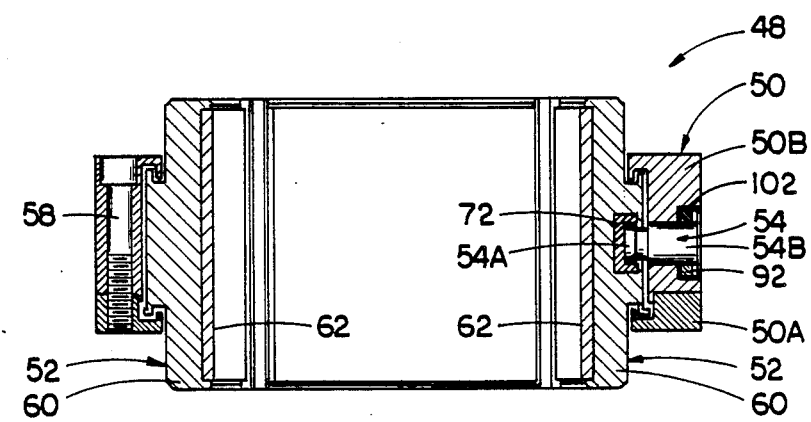
FIG. 5 is an axial sectional view of the bearing assembly taken along line 5—5 of FIG. 4.
Figure 6:
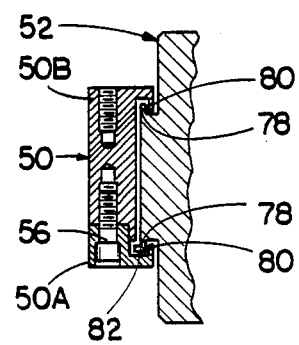
FIG. 6 is a fragmentary axial sectional view of the bearing assembly taken along line 6—6 of FIG. 4.
Figure 7:
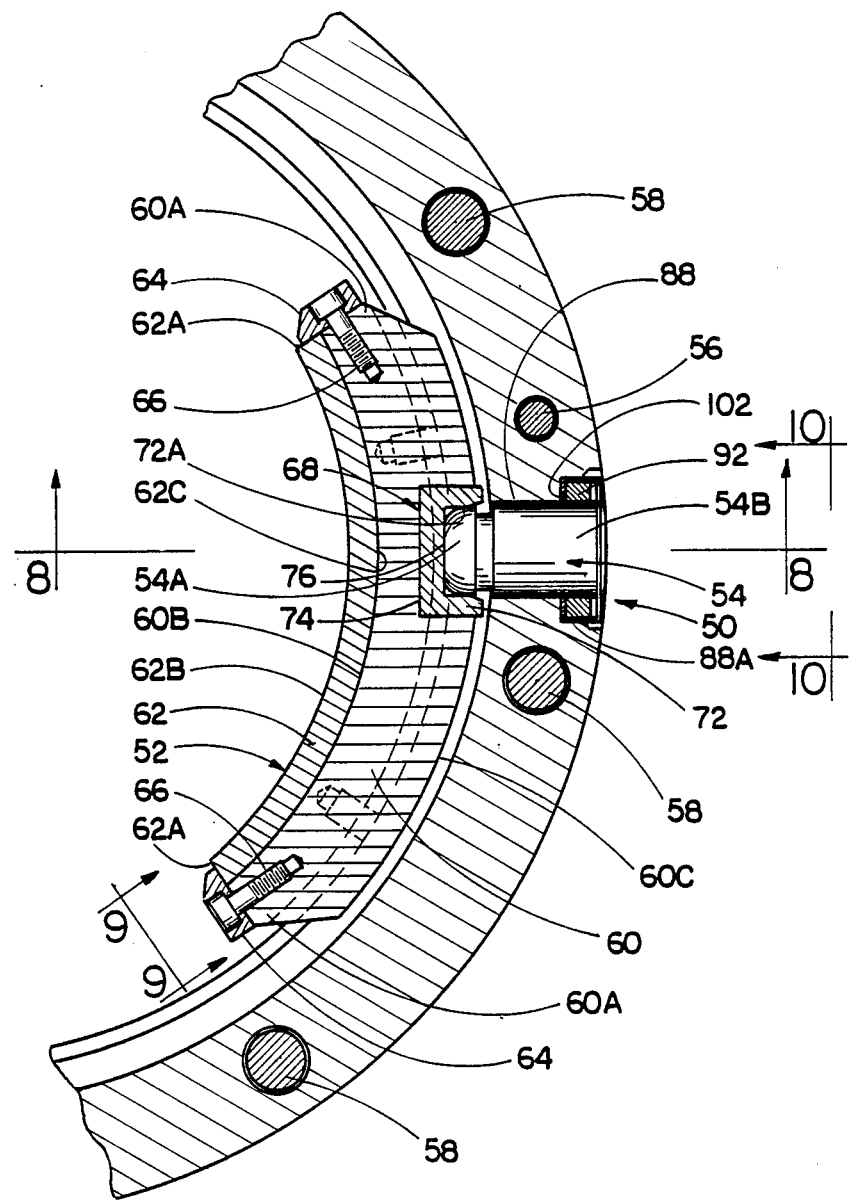
FIG. 7 is an enlarged view of the fragmentary sectioned portion of the bearing assembly illustrated in FIG. 4.
Figure 8:
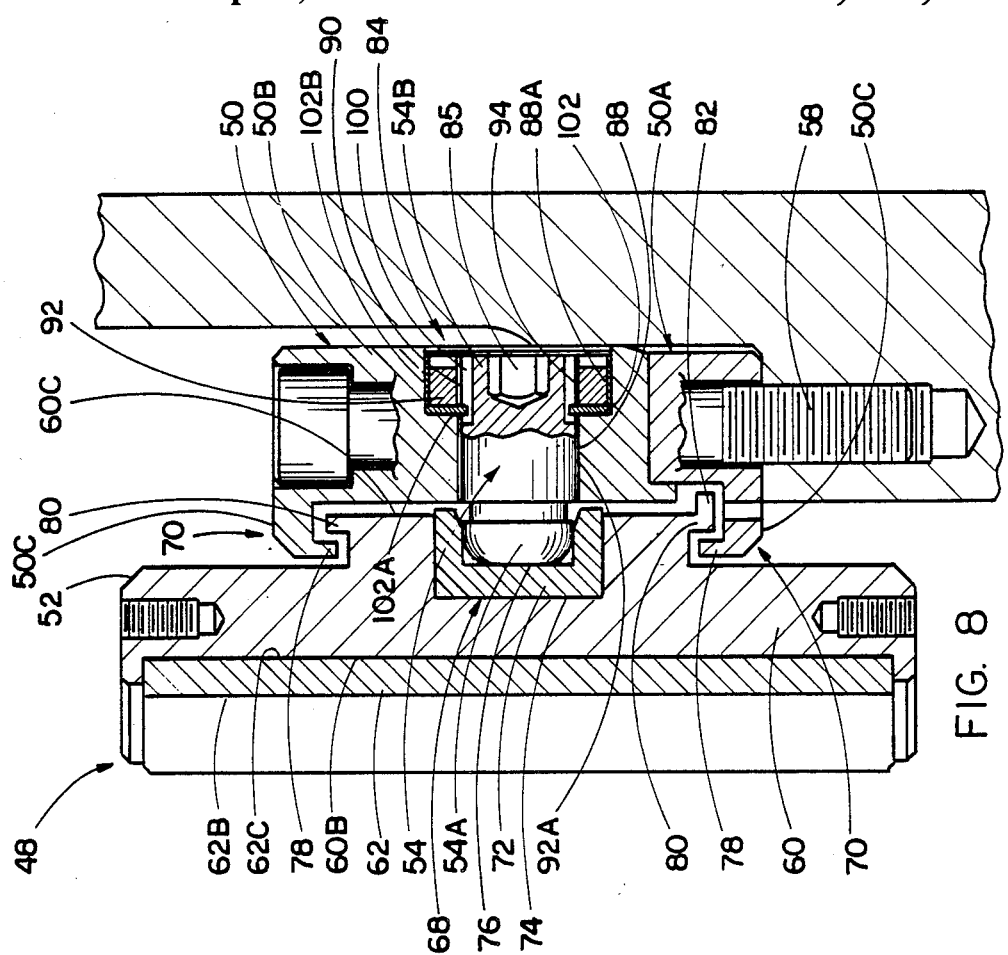
FIG. 8 is an axial sectional of the bearing assembly taken along line 8—8 of FIG. 7.
Figure 9:
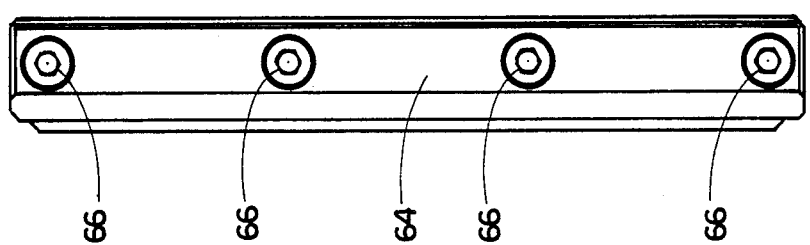
FIG. 9 is an elevational view of a clamp plate of the bearing assembly as seen along line 9—9 of FIG. 7.

More particularly, as best seen in FIGS. 5, 6 and 8, the annular member 50 is in the form of a split ring having lower and upper components 50A,50B which attach to one another by fasteners 56,58 and to the pump casing 32 only by fasteners 58. As best seen in FIGS. 4, 7 and 9, the arcuate bearing segments 52 are disposed end-to-end i circumferentially spaced relation for encompassing the shaft 22 and providing spaced arcuate regions of bearing contact therewith. Each bearing segment 52 includes an arcuate pad holder 60 having a pair of circumferentially spaced opposite ends 60A and radially spaced interior and exterior arcuate surfaces 60B,60C extending therebetween (best seen in FIG. 7). An arcuate bearing element 62 has a pair of circumferentially spaced opposite ends 62A and radially spaced interior and exterior arcuate surfaces 62B,62C extending therebetween. The interior surface 62B of each bearing element 62 provides the bearing contact with the shaft 22. Further, each bearing segment 52 includes a pair of clamp plates 64 attached by screws 66 to the opposite ends 60A of one of the pad holders 60 and engaged with opposite ends 62A of one of the bearing elements 62 for capturing the bearing element 62 therebetween and retaining the same at its exterior surface 62C adjacent to the interior surface 60B of the pad holder 60.

Also, as best seen in FIG. 8, the bearing assembly 48 includes means 68 for releasably and universally pivotally mounting each of the pivot pins 54 at an inner end 54A thereof to one of the bearing segments 52, and means 70 for retaining the respective bearing segments 52 on the annular member 50 to preclude inadvertent release of the pivot pins 54 at their inner ends 54A from the bearing segments 52 before the bearing assembly 48 is mounted about the shaft 22.

More particularly, as best seen in FIGS. 3-5, 7 and 8, the pivot pin inner end mounting means 68 includes a plurality of cup elements 72 one associated with each of the respective pad holders 60 of the bearing segments 52. Each cup element 72 has an internal bore surface 72A and is mounted in a cylindrical recess 74 formed in the exterior surface 60C of the one pad holder 60. Also, the mounting means 68 includes an external contact surface 76 defined on the inner end 54A of the respective one of the pivot pins 54 associated with the pad holder 60. In the exemplary embodiment, the cup element internal bore surface 72A has an annular cylindrical contour, whereas the pivot pin inner end contact surface 76 has an annular spherical contour allowing the universal pivoting therebetween. Alternatively, the respective surface contours could be reversed.

Figure 3:
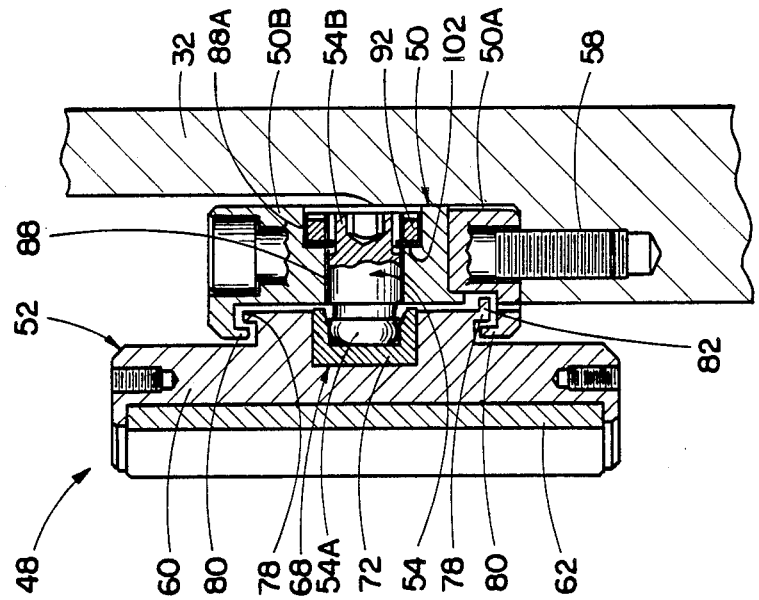
FIG. 3 is a fragmentary axial sectional view of a pivoted pad bearing assembly in accordance with the present invention.

Also, as best seen in FIGS. 3, 5 and 8, the retaining means 70 of the bearing assembly 48 for preventing inadvertent release of the pivot pins 54 from the pad holders 60 before installation of the bearing assembly 48 on the shaft 22 includes first and second sets of flanges 78,80. The first set of flanges 78 project axially toward one another respectively from opposite axially spaced ends 50C of an interior side of the annular member 50. The second set of flanges 80 project axially away from one another respectively from opposite axially spaced ends 60A of the exterior side or surface 60C of each of the pad holders 60. The axial projections and respective spacing between the first and second sets of flanges 78,80 permit interfitting of the respective sets of flanges with one another for loosely retaining each of the bearing segments 52 on the annular member 50. Also, an arcuate reference rim 82 fixed on and projecting outwardly from one (but not the other) of the opposite axial ends 60A at the exterior side 60C of each bearing segment pad holder identifies to a person assembling the bearing assembly 10 the correct orientation in which to mount each of the bearing segments 52 on the annular member 50.

Further, the bearing assembly 48 includes means 84 for mounting each of the pivot pins 54 at an outer end 54B thereof to the annular member 50 and being adjustable for changing the radial position of the pivot pin 54 relative to the annular member 50 and thereby of the bearing segment 52 relative to the shaft 22. A socket 85 is provided in the outer end 54B of pin 54 for receiving a complementary shaped tool (not shown) for turning the pin 54. Also, the bearing assembly 48 includes means 86 for lockably coupling each of the pivot pins 54 to the annular member 50 to fix the pivot pins 54 in the desired adjusted positions relative to the annular member 50.

Figure 10:
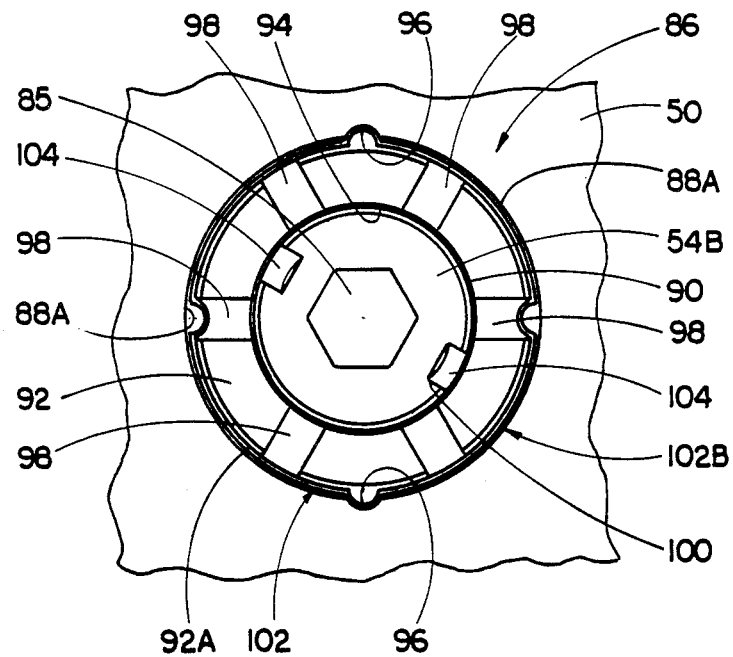
FIG. 10 is an enlarged fragmentary view of a pivot pin locking arrangement of the bearing assembly as seen along line 10—10 of FIG. 7.

More particularly, as seen in FIGS. 3, 5, 7, 8 and 10, and as best seen in FIG. 8 the pivot pin outer end mounting means 84 includes a plurality of circumferentially spaced and radially extending openings 88 defined through the annular member 50 for receiving the respective pivot pins 54. Also, a set of external threads 90 is formed on the outer end 54B of each of the pivot pins 54. A plurality of adjustment elements 92 in the form of nuts are also provided. Each adjustment nut 92 has a set of internal threads 94 formed thereon for threadably mating with the set of external threads 90 on one of the pivot pin outer ends 54B such that relative rotation between each pivot pin 54 and its respective adjustment nut 92 causes a change of the radial position of the pivot pin 54 relative to the annular member 50. As seen in FIG. 10, each adjustment nut 92 has a cylindrical exterior surface 92A and a plurality of radially extending notches 98 formed on the upper end of the nut 92 for receiving an end of a complementarily-shaped tool (not shown) for turning the nut 92.

Also, as seen in FIGS. 3, 5, 7, 8 and 10, the lockable coupling means 86 (best seen in FIG. 10) includes a pair of recesses 96 defined in the annular member 50 at the opposite sides of the periphery of each of the openings 88A and extending radially therefrom. Also, the lockable coupling means 86 uses a pair of the radially extending notches 98 formed in each adjustment nut 92 at opposite sides of the peripheral edge or exterior surface 92A thereof and extending radially toward the periphery of the respective one of the openings 88A, and a pair of longitudinally extending slots 100 defined in the outer end 54B of each pivot pin 54 and extending radially toward the periphery of the respective one of the openings.

The lockable coupling means 86 further includes a plurality of open-bottomed locking cups 102. Each cup 102, along with one of the adjustment nuts 92, is disposed in an outer enlarged diameter portion 88A of one of the openings 88 between its periphery and the nut. Also, each cup 102 has a pair of tabs 104 projecting inwardly toward one another from opposite sides of a bottom rim 102A of the cup 102. The projecting tabs 104 extend into the respective slots 100 in the pivot pin outer end 54B for maintaining the cup 102 in non-rotatable relation to the one pivot pin 54. Each cup 102 also has a deformable cylindrical sidewall 102B with portions deformed into the recesses 96 of the annular member 50 and the notches 98 of the adjustment nut 92 for maintaining the cup 102 in non-rotatable relation thereto. The cup 102 thus provides the structure for locking the pivot pin 54 and adjustment nut 92 to the annular member 50 so as to prevent rotation relative to the member 50.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A pivoted pad bearing assembly for rotatably supporting a shaft extending through a housing, said bearing assembly comprising:
   (a) an annular member attachable to the housing;
   (b) a plurality of arcuate bearing segments disposable end-to-end in circumferentially spaced relation for encompassing the shaft and providing bearing contact therewith;
   (c) a plurality of pivot pins each extending radially between said annular member and one of said bearing segments;
   (d) means for universally pivotally mounting each of said pivot pins at an inner end thereof to one of said bearing segments; and
   (e) means for mounting each of said pivot pins at an outer end thereof to said annular member and being adjustable for changing the radial position of said pivot pin relative to said annular member and thereby of said bearing segment relative to the shaft, said pivot pin outer end mounting means including
      (i) means defining a plurality of circumferentially spaced and radially extending openings through said annular member for receiving said respective pivot pins,
      (ii) a set of external threads formed on said outer end of each of said pivot pins, and
      (iii) a plurality of adjustment elements each having a set of internal threads formed thereon for threadably mating with said set of external threads on one of said pivot pin outer ends such that relative rotation between each pivot pin and its respective adjustment element causes a change of the radial position of said pivot pin relative to said annular member.

2. The bearing assembly as recited in claim 1, further comprising:
   a reference rim projecting outwardly from one of a pair of opposite axially spaced ends of an exterior side of each bearing segment for identifying the correct orientation in which to mount each of said bearing segments on said annular member.

3. The bearing assembly as recited in claim 1, wherein said pivot pin inner end mounting means includes:
   a plurality of cup elements each having an internal bore surface and being mounted in a recess formed at an exterior surface of one of said bearing segments; and
   an external contact surface on said inner end of each of said pivot pins, one of said cup element internal bore surface and said pivot pin inner end contact surface having an annular cylindrical contour and the other having an annular spherical contour for allowing said universal pivoting therebetween.

4. The bearing assembly as recited in claim 1, wherein each of said bearing segments includes:
   an arcute pad holder having a pair of circumferentially spaced opposite ends and an interior arcuate surface extending therebetween;
   an arcuate bearing element having a pair of circumferentially spaced opposite ends and an interior arcute surface for providing said bearing contact with the shaft; and
   a pair of clamp plates attached to said opposite ends of said pad holder and engaged wit opposite ends of said bearing element for capturing said arcuate bearing element therebetween and retaining the same adjacent to said interior arcuate surface of said pad holder.

5. The bearing assembly as recited in claim 1, further comprising:
   means for lockably coupling said pivot pins to said annular member to fix said pivot pins in desired adjusted positions relative to said annular member.

6. The bearing assembly as recited in claim 5, wherein said lockable coupling means includes:
   means defining at least one recess in said annular member at the periphery of each of said openings which extends radially from said opening;
   means defining at least one notch in a peripheral edge of each of said adjustment element which extends radially to one of said openings;
   means defining at least one longitudinally extending slot in said outer end of each of said pivot pins which also extends radially to one of said openings; and
   a plurality of locking cups each being disposable in one of said openings, each of said cups having at least one projection capable of extending into said slot for maintaining said cup in non-rotatable relation to one of said pivot pins, each of said cups having a cylindrical wall with portions deformable into one of said recesses of said annular member and one of said notches of said adjustment element for maintaining said cup in nonrotatable relation thereto.

7. A pivoted pad bearing assembly for rotatably supporting a shaft extending through a housing, said bearing assembly comprising:
   (a) an annular member attachable to the housing;
   (b) a plurality of arcuate bearing segments disposable end-to-end in circumferentially spaced relation for encompassing the shaft and providing bearing contact therewith, each of said bearing segments including
      (i) an arcuate pad holder having a pair of circumferentially spaced opposite ends and an interior arcuate surface extending therebetween,
      (ii) an arcuate bearing element having a pair of circumferentialy spaced opposite ends and an interior arcuate surface for providing said bearing contact with the shaft, and
      (iii) a pair of clamp plates attached to said opposite ends of said pad holder and engaged with opposite ends of said bearing element for capturing said bearing element therebetween and retaining the same adjacent to said interior arcuate surface of said pad holder;
   (c) a plurality of pivot pins each extending radially between said annular member and one of said bearing segments;
   (d) means for releasably and universally pivotally mounting each of said pivot pins at an inner end thereof to one of said bearing segments;

(e) means for mounting each of said pivot pins at an outer end thereof to said annular member; and (f) means for retaining said bearing segments on said annular member to preclude inadvertent release of said pivot pins at their inner ends from said bearing segments before said bearing assembly is mounted about the shaft.

8. The bearing assembly as recited in claim 7, further comprising:

a reference rim outwardly from one of a pair of opposite axially ends of an exterior side of each bearing segment for identifying the correct orientation in which to mount each of said bearing segments on said annular member.

9. The bearing assembly as recited in claim 7, wherein said retaining means includes:

a first set of flanges projecting respectively from a pair of opposite axially spaced ends of an interior side of said annular member; and a second set of flanges projecting respectively from a pair of opposite axially spaced ends of an exterior side of each of said bearing segments, said first and second sets of flanges projecting in axial directions to permit interfitting with one another for loosely retaining said bearing segments on said annular member.

10. The bearing assembly as recited in claim 7, wherein said pivot pin outer end mounting means is adjustable for changing the radial position of said pivot pin relative to said annular member and thereby of said bearing segments relative to the shaft.

11. The bearing assembly as recited in claim 7, further comprising:

means for lockably coupling said pivot pin to said annular member to fix said pivot pin in a desired adjusted position relative to said annular member.

12. The bearing assembly as recited in claim 7, wherein said pivot pin inner end mounting means includes:

a plurality of cup elements each having an internal bore surface and being mounted in a recess formed at an exterior surface of each of said bearing segments; and an external contact surface on said inner end of each of said pivot pins, one of said cup element internal bore surface and said pivot pin inner end contact surface having an annular cylindrical contour and the other having an annular spherical contour allowing said universal pivoting therebetween.

13. A pivoted pad bearing assembly for rotatably supporting a shaft extending through a housing, said bearing assembly comprising:

(a) an annular member attachable to the housing;

(b) a plurality of arcuate bearing segments disposable end-to-end in circumferentially spaced relation for encompassing the shaft and providing bearing contact therewith;

(c) a plurality of pivot pins each extending radially between said annular member and one of said bearing segments;

(d) means for releasably and universally pivotally mounting each of said pivot pins at an inner end thereof to one of said bearing segments;

(e) means for retaining said bearing segments on said annular member to preclude inadvertent release of said pivot pins at their inner ends from said bearing segments before said bearing assembly is mounted about the shaft; and (f) means for mounting each of said pivot pins at an outer end thereof to said annular member, said pivot pin outer end mounting means including (i) means defining a plurality of circumferentialy spaced and radially extending openings through said annular member for receiving said respective pivot pins, (ii) a set of external threads formed on said outer end of each of said pivot pins, and (iii) a plurality of adjustment elements each having a set of internal threads formed thereon for threadably mating with said set of external threads on one of said pivot pin outer ends such that relative rotation between each pivot pin and its respective adjustment element causes a change of the radial position of said pivot pin relative to said annular member.

14. The bearing assembly as recited in claim 13, further comprising:

means for lockably coupling said pivot pins to said annular member to fix said pivot pins in desired adjusted position relative to said annular member.

15. The bearing assembly as recited in claim 14, wherein said lockable coupling means includes:

means defining at least one recess in said annular member at the periphery of each of said openings which extend radially from said opening;

means defining at least one notch in a peripheral edge of each of said adjustment element which extends radially to one of said openings;

means defining at least one longitudinally extending slot in said outer end of each of said pivot pins which also extends radially to one of said openings; and a plurality of locking cups each being disposable in one of said openings, each of said cups having at least one projection capable of extending into said slot for maintaining said cup in non-rotatable relation to one of said pivot pins, each of said cups having a cylindrical wall with portions deformable into one of said recesses of said annular member and one of said notches of said adjustment element for maintaining said cup in non-rotatable relation thereto.

16. In a pump having a shaft extending through a housing, a pivoted pad bearing assembly for rotatably supporting said shaft, said bearing assembly comprising:

(a) an annular member attached to said housing;

(b) a plurality of arcuate bearing segments disposable end-to-end in circumferentially spaced relation for encompassing the shaft and providing bearing contact therewith;

(c) each of said bearing segments including an arcuate pad holder having a pair of circumferentially spaced opposite ends and radially spaced interior and exterior arcuate surfaces extending therebetween, an arcuate bearing element having a pair of circumferentially spaced opposite ends and an interior arcuate surface for providing said bearing contact with the shaft, and a pair of clamp plates attached to said opposite ends of said pad holder and engaged with opposite ends of said bearing element for capturing said bearing element therebetween and retaining the same adjacent to said interior arcuate surface of said pad holder;

(d) a plurality of pivot pins each extending radially between said annular member and one of said bearing segments;

(e) means for releasably and universally pivotally mounting each of said pivot pins at an inner end thereof to one of said bearing segments;

(f) means for mounting each of said pivot pins at an outer end thereof to said annular member and being adjustable for changing the radial position of said pivot pin relative to said annular member and thereby of said bearing segment relative to the shaft; and (g) means for lockably coupling said pivot pin to said annular member to fix said pivot pin in a desired adjusted position relative to said annular member.

17. The bearing assembly as recited in claim 16, wherein said pivot pin outer end mounting means includes:

means for defining a plurality of circumferentially spaced and radially extending openings through said annular member for receiving said respective pivot pins;

a set of external threads formed on said outer end of each of said pivot pins; and a plurality of adjustment elements each having a set of internal threads formed thereon for threadably mating with said set of external threads on one of said pivot pin outer ends such that relative rotation between each pivot pin and its respective adjustment element causes a change of the radial position of said pivot pin relative to said annular member.

18. The bearing assembly as recited in claim 17, wherein said lockable coupling means includes:

means defining at least one recess in said annular member at the periphery of each of said openings which extends radially from said opening;

means defining at least one notch in a peripheral edge of each of said adjustment element which extends radially to one of said openings;

means defining at least one longitudinally extending slot in said outer end of each of said pivot pins which also extends radially to one of said openings; and a plurality of locking cups each being disposable in one of said openings, each of said cups having at least one projection capable of extending into said slot for maintaining said cup in non-rotatable relation to one of said pivot pins, each of said cups having a cylindrical wall with portions deformable into one of said recesses of said annular member and one of said notches of said adjustment element for maintaining said cup in non-rotatable relation thereto.

19. The bearing assembly as recited in claim 16, further comprising:

means for retaining said arcuate bearing segments on said annular member to preclude inadvertent release of said pivot pins at their inner ends from said arcuate bearing segments before said bearing assembly is mounted about the shaft.

20. The bearing assembly as recited in claim 19, wherein said retaining means includes:

a first set of flanges projecting respectively from opposite axially spaced ends of an interior side of said annular member; and a second set of flanges projecting respectively from opposite axially spaced ends of an exterior side of each of said bearing segments, said first and second sets of flanges projecting in axial directions to permit interfitting with one another for loosely retaining said bearing segments on said annular member.

21. The bearing assembly as recited in claim 16, further comprising:

a reference rim projecting outwardly from one of a pair of opposite axial ends of an exterior side of each bearing segment for identifying the correct orientation in which to mount each of said bearing segments on said annular member.

22. In a pump having a shaft extending through a housing, a pivoted pad bearing assembly for rotatably supporting said shaft, said bearing assembly comprising:

(a) an annular member attached to said housing;

(b) a plurality of arcuate bearing segments disposable end-to-end in circumferentially spaced relation for encompassing the shaft and providing bearing contact therewith, each of said bearing segments including (i) an arcuate pad holder having a pair of circumferentially spaced opposite ends and radially spaced interior and exterior arcuate surfaces extending therebetween, (ii) an arcuate bearing element having a pair of circumferentially spaced opposite ends and an interior arcuate surface of providing said bearing contact with the shaft, and (iii) a pair of clamp plates attached to said opposite ends of said pad holder and engaged with opposite ends of said bearing element for capturing said bearing element therebetween and retaining the same adjacent to said interior arcuate surface of said pad holder;

(d) a plurality of pivot pins each extending radially between said annular member and one of said bearing segments;

(e) means for mounting each of said pivot pins at an outer end thereof to said annular member and being adjustable for changing the radial position of said pivot pin relative to said annular member and thereby of said bearing segment relative to the shaft;

(f) means for lockably coupling said pivot pin to said annular member to fix said pivot pin in a desired adjusted position relative to said annular member; and (g) means for releasably and universally pivotally mounting each of said pivot pins at an inner end thereof to one of said bearing segments, said pivot pin inner end mounting means including (i) a plurality of cup elements each having an internal bore surface and being mounted in a recess formed at said exterior surface of each of said bearing segments, and (ii) an external contact surface on said inner end of each of said pivot pins, one of said cup element internal bore surface and said pivot pin inner end contact surface having an annular cylindrical contour and the other having an annular spherical contour allowing said universal pivoting therebetween.

* * * * *